United States Patent [19]

Sullivan

[11] Patent Number: 5,227,149
[45] Date of Patent: Jul. 13, 1993

[54] PROCESS FOR MAKING SILICON MONOSULFIDE AND ALUMINUM SULFIDE

[76] Inventor: Thomas M. Sullivan, P.O. Box 4615, San Diego, Calif. 92164

[21] Appl. No.: 772,784

[22] Filed: Oct. 8, 1991

[51] Int. Cl.$^5$ .......................... C01F 7/70; C01B 33/00
[52] U.S. Cl. ..................... 423/324; 423/561.1
[58] Field of Search ............................. 423/324, 561.1

[56] References Cited

U.S. PATENT DOCUMENTS

| | | | |
|---|---|---|---|
| 3,211,527 | 10/1965 | Forsyth | 423/344 |
| 3,615,266 | 10/1971 | Donohue | 423/324 |
| 3,979,500 | 9/1976 | Sheppard et al. | 423/561.1 |
| 4,552,740 | 11/1985 | Morgan et al. | 423/345 |
| 4,557,914 | 12/1985 | Modone | 423/561.1 |
| 5,087,433 | 2/1992 | Enomoto et al. | 423/345 |

FOREIGN PATENT DOCUMENTS

| | | | |
|---|---|---|---|
| 60-191006 | 9/1985 | Japan | 423/561.1 |
| 3-103312 | 4/1991 | Japan | 423/561.1 |

Primary Examiner—Gary P. Straub
Attorney, Agent, or Firm—H. Jay Spiegel

[57] ABSTRACT

Processes are disclosed for making amorphous silicon nitride, silicon carbide and aluminum nitride. One of the processes involves reaction with ammonia or amine compounds with silicon or aluminum compounds containing sulfur at temperatures below 500° C. Another process involves reacting silicon or aluminum metals with hydrogen sulfide in the presence of catalysts to form silicon monosulfide or aluminum sulfide at temperatures below 500° C. Other methods of making ceramic materials are disclosed, all performed at temperatures below 500° C.

4 Claims, No Drawings

PROCESS FOR MAKING SILICON MONOSULFIDE AND ALUMINUM SULFIDE

BACKGROUND OF THE INVENTION

The present invention relates to the production of advanced ceramics using supercritical fluid technology.

Silicon nitride is a hard, high strength, light weight structural ceramic with useful thermal shock resistance and toughness. Many uses have been identified in automobile drivetrains, air conditioning compressors, bearings, cutting tools, and chemical process systems.

The high thermal conductivity of aluminum nitride makes it useful for electronic substrates.

Powder metallurgy, high temperature reaction bonding, and sol gel methods for making advanced ceramics are well known. U.S. Pat. No. 4,961,913 to Sullivan describes a method using supercritical fluids to react and extract silicon containing solids or organometallic halides to form bonded ceramic materials. U.S. Pat. No. 5,011,819 to Leibovitz describes a method using supercritical fluids to extract byproducts from materials to form pure powders with controlled stoichiometry for making 1-2-3 superconductive ceramics. U.S. Pat. No. 4,552,786 to Berneburg et al. describes a method using supercritical fluids to transport organometallic polymers into a fiber architecture preform followed by pyrolysis. As should be self-evident from the description hereinafter, the present invention distinguishes from the teachings of these patents.

Chemical vapor reaction between silicon monosulfide vapor and gaseous ammonia at temperatures ranging from about 1250° C. to 1500° C. is described by Forsyth in U.S. Pat. No. 3,211,527 as means of making silicon nitride. U.S. Pat. No. 4,552,740 to Morgan et al. describes a method of making silicon nitride by first reacting silicon metal with hydrogen sulfide at 800° C. to 1000° C. followed by reaction of silicon disulfide with gaseous ammonia between 800° C. to 1200° C. Silicon carbide can also be made by substituting an amine gas for ammonia. Again, the present invention distinguishes from the teachings of these references. The low temperatures of the reactions disclosed herein are not taught in the prior art.

SUMMARY OF THE INVENTION

An object of the invention is to make amorphous silicon nitride, silicon carbide, or aluminum nitride.

More particularly, the object of the invention is to provide a process for making amorphous silicon nitride, silicon carbide, or aluminum nitride by the reaction of ammonia or amine compounds with silicon or aluminum compounds containing sulfur at temperatures between ambient and 500° C. in the presence of catalysts.

Another object of the invention is to react silicon or aluminum metals with hydrogen sulfide ($H_2S$) in the presence of catalysts to form silicon monosulfide (SiS) or aluminum sulfide ($Al_2S_3$) at temperatures between ambient and 500° C. One useful variation of this approach is to react organometallic thiols, mercaptans, or sulfides containing silicon or aluminum with ammonia at temperatures between ambient and 500° C. Organometallic thiols, mercaptans, or sulfides can be made in chemical process systems apart from the autoclave used to react them to nitride or carbide ceramics.

A further object is to react fluidic organosilicon or colloidal silicon with hydrogen sulfide in the presence of catalysts to form silicon monosulfide at temperatures between ambient and 500° C.

A still further object is to react fluidic organoaluminum or colloidal aluminum with hydrogen sulfide in the presence of catalysts to form aluminum sulfide at temperatures between ambient and 500° C., and react the sulfide with ammonia to form aluminum nitride.

The present invention improves the economics of making net shape and near net shape ceramic components by lowering process temperatures sufficiently to enable the use of commonly available corrosion resistant alloys and seal materials. Corrosion resistant alloys are advantageous for making precision molds which can be used and reused for mass production components.

SPECIFIC DESCRIPTION OF THE PREFERRED EMBODIMENTS

Silicon monosulfide and aluminum sulfide are susceptible to moisture contamination. Sulfide compounds are therefore made in a purged autoclave which is not reopened until the silicon nitride object is removed.

For purposes of the present invention, silicon monosulfide or aluminum sulfide are made by passing hydrogen sulfide over powder metal compresses at temperatures between ambient and 500° C. in the presence of catalysts selected from the group consisting of Ni, Co, V, Mo, Pd, Pt, Re, Rb, Ru, Rh, Os, Ir, Ti, Zr, Sn, Fe, La, Y, and Sc. Finely divided metal powder is compressed to provide a large exposed surface area for reaction with hydrogen sulfide. Hydrogen sulfide is circulated through the heated compress. A portion of the hydrogen sulfide reacts with the metal to form the metal sulfide and hydrogen. Hydrogen is separated and the hydrogen sulfide recirculated until all metal is converted to metal sulfide. Hydrogen sulfide can either be a gas or a supercritical fluid in which gas and liquid specific volumes are indistinguishable.

Fluidic organometallic or colloidal metal compounds can also be used to make metal sulfide compounds. Fluidic raw materials are pumped into heated molds simultaneously with hydrogen sulfide. The reaction is accelerated to completion at lower temperatures by catalysts selected from the group consisting of Ni, Co, V, Mo, Pd, Pt, Re, Ru, Rh, Rb, Os, Ir, Ti, Zr, Sn, Fe, La, Y, or Sc. One or both of the reactants can be supercritical fluids.

Metal sulfide compounds are reacted with liquid or supercritical ammonia to form nitride ceramics in the presence of catalysts at temperatures between ambient and 200° C. and pressures between 115 psi and 2,000 psi. Catalysts like Pd, Pt, Re, Rb, Ru, Rh, Os, Ir, Ti, Zr, Sn, Fe, La, Y, or Sc accelerate the reaction to completion. If an amine is substituted for ammonia at temperatures between ambient and 500° C., a carbide is formed.

Fluidic organometallic thiols, mercaptans, and sulfide compounds can be made using methods well known in the art. The present invention can utilize these compounds in place of metal sulfides. In this embodiment, fluidic materials containing a metal and sulfur are pumped into a mold at a controlled rate simultaneously with ammonia or amines. Entrainers are used to control contact.

The following are examples of practice of the invention, although it will be understood that these examples are to be considered as exemplary only.

EXAMPLE 1

Finely divided silicon metal is pressed into a 59% dense compress. The compress is placed in a mold and the mold placed in an autoclave. Heated to 450° C., hydrogen sulfide gas is passed over a cobalt molybdate catalyst before pass flowing into the powdered metal compress. Sulfur reacts with silicon to form silicon monosulfide with hydrogen as a byproduct. Hydrogen sulfide is recirculated until it is substantially consumed by the reaction. Hydrogen is removed from the autoclave as it cools to less than 133° C.. Ammonia is pumped through the autoclave at pressures between 115 psi and 2,000 psi and temperatures between ambient and 200° C. to react with silicon monosulfide. Silicon nitride, silicane diimide, and ammonia sulfides are formed. Ammonium sulfide is extracted with excess ammonia.

EXAMPLE 2

EXAMPLE 1 wherein the temperature of the hydrogen sulfide and powdered metal compress is between 100° C. and 130° C. and the pressure of the autoclave is between 1,300 psi and 1,700 psi in the presence of a heterogenous nickel palladium catalyst. The ammonia reaction remains unchanged.

EXAMPLE 3

EXAMPLE 2 wherein a homogenous yttrium catalyst is used.

EXAMPLE 4

EXAMPLE 2 wherein an aluminum metal compress is used.

EXAMPLE 5

Silicon thiocyanate is pumped into a mold in an autoclave containing ammonia at supercritical conditions and a solvent at temperatures between 144° C. and 200° C. and pressures from 115 psi to 2,000 psi. Silicon nitride, silicane diimide, and ammonium byproducts are formed. Ammonium byproducts are removed with excess ammonia.

EXAMPLE 6

EXAMPLE 5 wherein a heterogenous palladium molybdate catalyst is used.

EXAMPLE 7

EXAMPLE 5 wherein a heterogenous nickel palladium catalyst is used.

EXAMPLE 8

Hexamethylsilicane is pumped into an autoclave simultaneously with hydrogen sulfide at temperatures between ambient and 112° C. and pressures between 1,300 psi and 1,700 psi. The hydrogen sulfide is passed over a heterogenous palladium catalyst. Silicon monosulfide is formed along with methane and hydrogen. Methane and hydrogen are released prior to reacting and extracting with ammonia at temperatures between ambient and 200° C. and pressures between 115 psi and 2,000 psi. Silicon nitride, silicane diimide, and ammonium sulfide byproducts are formed. Ammonium sulfide is removed with excess ammonia.

EXAMPLE 9

EXAMPLE 8 wherein a homogenous yttrium hydroxide catalyst is used in addition to heterogenous palladium.

EXAMPLE 10

EXAMPLE 8 wherein ethylamine is used instead of ammonia to form silicon carbide. Temperatures between 183° C. and 240° C. and pressures between 816 psi and 1,060 psi are used.

EXAMPLE 11

EXAMPLE 8 wherein triphenylaluminum is used instead of hexamethylsilicane. The temperature ranges from 196° C. to 200° C. and the pressure ranges from 1,300 psi to 2,000 psi during the reaction with hydrogen sulfide to form aluminum sulfide.

EXAMPLE 12

EXAMPLE 8 wherein silicon tetrachloride is used instead of hexamethylsilicane and the temperature is between ambient and 144° C. This reaction is conducted in an amine solvent, which is removed prior to reacting and extracting with ammonia.

I claim:

1. A process for producing silicon monosulfide including the steps of simultaneously pumping a fluidic silicon compound selected from the group consisting of:
   a. organosilicon compounds having the formula $R_1Si$ in which R is an alkyl group having 1-6 carbons;
   b. organosilicon compounds having the formula $R_6Si_2$ in which $R^1$ is an alkyl group having 1-6 carbons;
   c. chlorinated silicon compounds having the formula selected from the group $R_3SiCl$, $R_2SiCl_2$, $RSiCl_3$ or $SiCl_4$, where R is an alkyl group having 1-6 carbons;

and liquid or supercritical fluid hydrogen sulfide into an autoclave and reacting them at temperatures between ambient and 200° C. at pressures of between 1300 psi and 1700 psi.

2. The process of claim 1, further including the step of contacting the reactants with heterogenous or homogenous catalysts made up of one or more elements selected from the group consisting of Ni, Co, V, Mo, Pd, Pt, Re, Rb, Ru, Rh, Os, Ir, Ti, Zr, Sn, Fe, La, Y, and Sc.

3. A process for making aluminum sulfide including the steps of simultaneously adding a fluidic aluminum compound selected from the group consisting of organoaluminum compounds having the formula $R_3Al$ in which R is an alkyl group having 1-6 carbons, and liquid or supercritical fluid hydrogen sulfide into an autoclave and reacting them at a temperature between ambient and 200° C. and a pressures of between 1300 psi and 1700 psi.

4. The process of claim 3 including the step of contacting the reactants with heterogenous or homogenous catalysts made up of one or more elements selected from the group consisting of Ni, Co, V, Mo, Pd, Pt, Re, Rb, Ru, Rh, Os, Ir, Ti, Zr, Sn, Fe, La, Y and Sc.

* * * * *